Nov. 12, 1963
J. D. DANNER
3,110,120
REVERSIBLE SLIDE MAGAZINE DRIVE
Filed Sept. 28, 1960
3 Sheets-Sheet 1
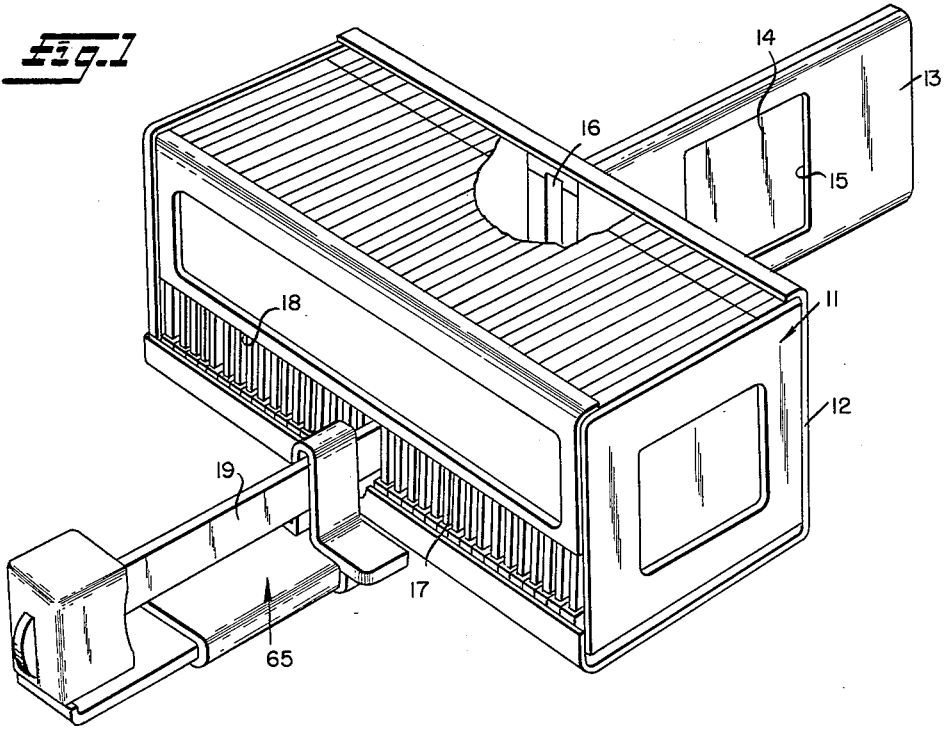
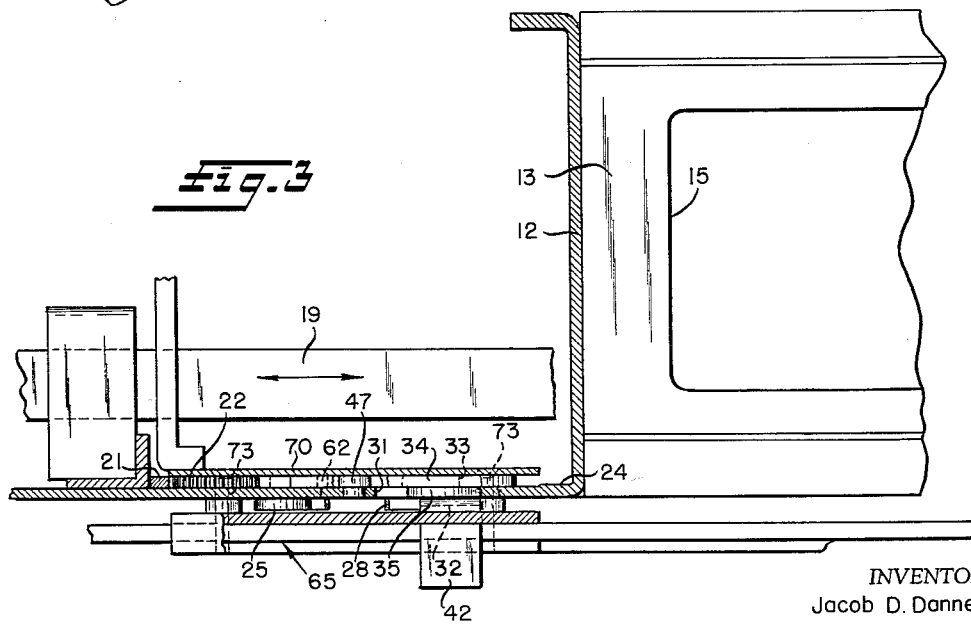
INVENTOR
Jacob D. Danner
BY
*Staruch, Nolan & Neale*
ATTORNEYS

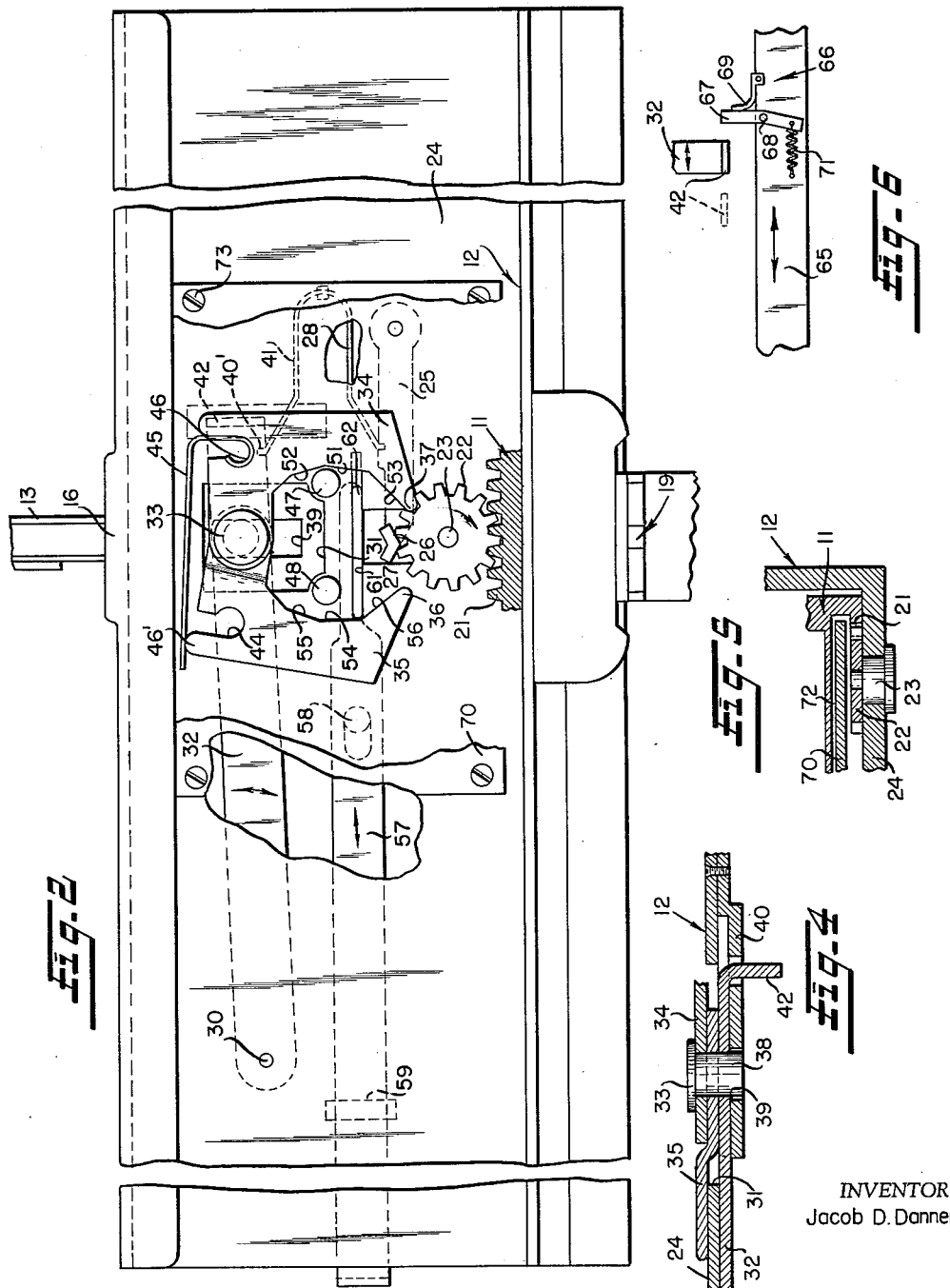

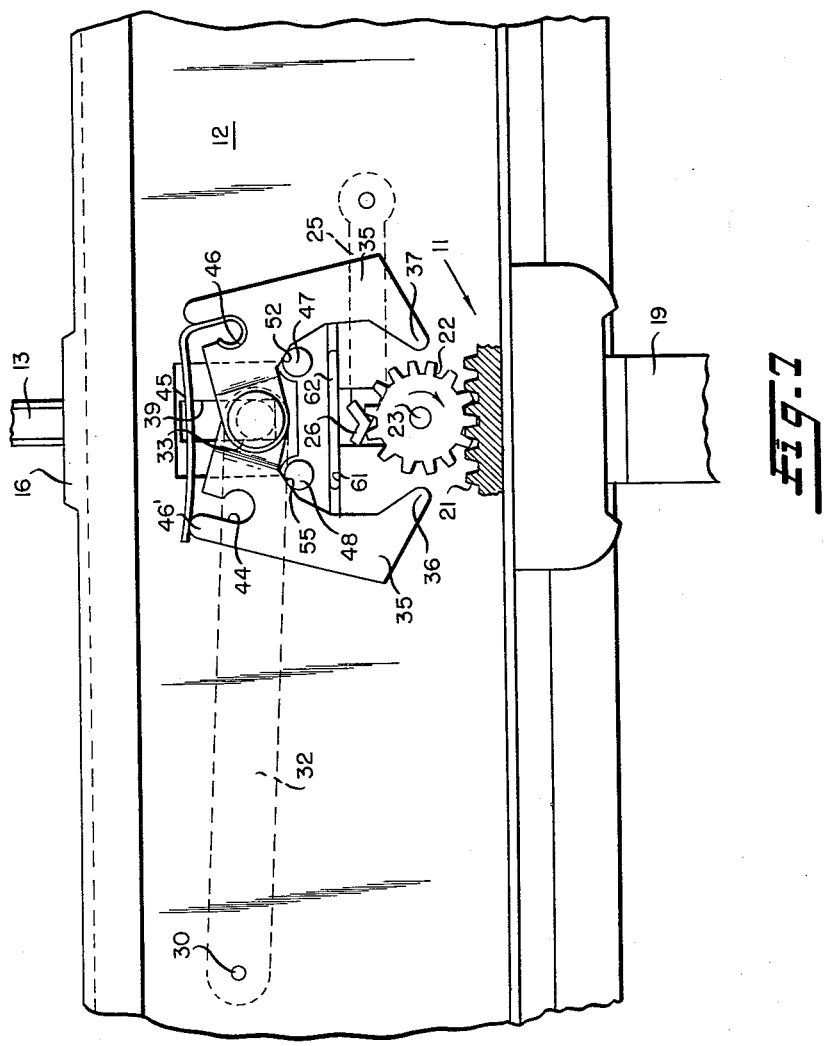

3,110,120
Patented Nov. 12, 1963

3,110,120
REVERSIBLE SLIDE MAGAZINE DRIVE
Jacob D. Danner, Whitemore Lake, Mich., assignor, by mesne assignments, to Argus Incorporated, a corporation of Delaware
Filed Sept. 28, 1960, Ser. No. 59,032
11 Claims. (Cl. 40—79)

This invention relates to drives for slide transparency magazines of the type used in automatic slide projectors and is particularly concerned with mechanism providing a reversible drive whereby direction of shift of the magazine may be selected at any time.

Automatic slide projectors wherein the slides are contained in a magazine and extracted for projection and replaced one at a time are usually provided with an indexing mechanism whereby the magazine automatically shifts forwardly one step about equal to the slide edge dimension after slide replacement, to align the next slide to be projected with the slide handling device.

Sometimes it is desired during projection of a series of slides arranged in a certain order in a magazine to return to a previous scene, but in currently available projectors for the home and like markets the slide indexing mechanism is not reversible, and many times it is necessary to take out the whole magazine and run through the slides in forward order to reach the scene desired.

The present invention satisfies an existing need for a simple and inexpensive slide magazine indexing drive which is selectively reversible at any time. In its preferred embodiment the invention will be described as applied to a magazine handling device similar to that of Wiklund Patent 2,711,602 but it will be understood that it is applicable to other forms of slide magazine and slide handling devices as will appear and as will be noted from the scope of the claims.

It is therefore the major object of this invention to provide a novel reversible drive for a slide magazine.

A further object of this invention is to provide a reversible slide magazine drive having a novel arrangement for selecting directional drive of the magazine.

Another object of the invention is to provide a novel projector slide magazine drive wherein the magazine is slidably mounted and provided with a toothed section engaging a rotatable indexing member, and novel means is provided for selecting and accomplishing rotation of the index member in opposite directions.

A further object of the invention is to provide a novel reversible drive for a slide projector magazine wherein a rotatable toothed magazine drive wheel is selectively driven by separate pawls.

Further objects of the invention will presently appear in connection with the appended claims and the annexed drawings wherein:

FIGURE 1 is a generally perspective overall view of a slide magazine handling device of the type to which the invention is applicable;

FIGURE 2 is a top plan view, partly fragmentary and sectioned, showing the reversing magazine drive according to a preferred embodiment of the invention; with the parts positioned at the beginning of a slide change cycle;

FIGURE 3 is a fragmentary side elevation partly in section showing further arrangement of parts of FIGURE 2;

FIGURE 4 is an enlarged fragmentary section showing the arrangement of parts at the pawl pivot;

FIGURE 5 is an enlarged fragmentary section showing the magazine drive from the index wheel;

FIGURE 6 is a fragmentary bottom view showing the one-way drive connection to the pawl lever; and FIGURE 7 illustrates the parts of FIGURE 2 at the end of a slide change cycle with the slide injector fully retracted.

The compartmented slide magazine 11 of FIGURE 1 is adapted for step by step indexed longitudinal advancement along a guide 12 which is a fixed part of the projector. A slide positioning tube 13 containing a slidable shutter 14 normally spring biased to cover a projection aperture 15 is open at its inner end to guide 12 through a vertical slot 16.

The transparent slides 17, each in its compartment, are exposed through side slot 18 in the magazine to be engaged by a transverse pusher 19 for pushing them through slot 16 into tube 13 for projection when moved to the right in FIGURE 1 and pulling them back into the magazine on the return stroke to the left in FIGURE 1. This mechanism may be essentially the same as disclosed in Wiklund Patent No. 2,711,602.

That patent also discloses an indexing mechanism which, upon the return of each slide from tube 13, automatically shifts the magazine in a forward direction along guide 12 a distance equal to the distance between magazine compartments so that the next slide will be located for engagement by pusher 19.

The patent, however, discloses an indexing mechanism which will shift the magazine in a forward direction, and in its preferred embodiment the present invention provides a selective mechanism whereby such a magazine may be automatically indexed in either forward or reverse direction by the action of the pusher.

Referring now to FIGURE 2 a portion only of magazine 11 is shown in the position it occupies on the guide 12, and the bottom of the magazine is provided with a series of rack teeth 21 that mesh with a toothed index wheel 22 which is rotatable about a vertical axis perpendicular to the direction of magazine movement. In the preferred embodiment wheel 22 is fixed on a shaft 23 that is suitably journalled on the horizontal sheet metal base plate 24 of guide 12, and shaft 23 is suitably held against axial movement.

A detent lever 25 is pivoted upon the underside of plate 24 and it carries on its free end a V-shaped detent 26 which projects up through an aperture 27 in plate 24 to engage wheel 22 in a space between adjacent teeth. A spring arm 28 bears on lever 25 to bias detent 26 against the index wheel and the V-shape of the detent insures that it will always center itself with the space between adjacent teeth.

Plate 24 is formed with an enlarged aperture at 31. A pawl carrier lever 32 is pivoted upon a fixed vertical pivot axis at 30 on the underside of plate 24 to swing horizontally. At the free end of lever 32 a pivot stud 33 projects up through aperture 31 which is preferably a fixed cylindrical button, and a pair of substantially identical but reversed pawls 34 and 35 are pivoted on stud 33 one just above the other for horizontal swinging movement.

At their free ends pawls 34 and 35 are formed with projections 36 and 37 respectively adapted to engage index wheel 22. FIGURE 2 shows pawl 34 positioned with projection 37 operatively engaging wheel 22.

As shown in FIGURE 4, the pawls 34 and 35 which are essentially flat sheet metal stampings have their pivot ends slightly vertically displaced on stud 33 which is fixed on lever 32 and has its lower end 38 disposed in a guide slot 39 in a plate 40 fixed belowd plate 24. The enlarged head of stud 33 axially traps the pawls on the stud. Thus both pawls 34 and 35 are disposed at the same level and slidably overlie the flat surface of plate 24 at opposite sides of wheel 22.

As shown in FIGURE 2 a vertical plane bisecting tube 13 along its length intersects the effective centers of stud 33, slot 39, detent 26 and shaft 23.

A spring arm 41 enters a notch 40' in lever 32 and biases lever 32 counterclockwise in FIGURE 2. As shown spring arms 28 and 41 may be the opposite arms of a single spring wire element intermediately anchored on plate 24. The opposite ends of slot 39 serve as stops limiting swinging movement of lever 32, and normally lever 32 is biased to locate the parts as shown in FIGURE 2.

An actuating projection 42 (FIGURE 4) which is the downturned end of lever 32 near stud 33 projects through a suitable slot below plate 40, and it will be seen that by applying force to projection 42 the lever 32 carrying the pawls may be swung clockwise, or released to be swung counterclockwise by spring 41. Since the lever 32 is fairly long, stud 33 moves substantially in a straight line toward and from the axis of shaft 23.

Each pawl has an edge notch 44, and a spring beam 45 has one end 46 trapped in notch 44 of pawl 34 and extends into slidable bearing engagement with the rounded tip 46' of pawl 35 at the other side of stud 33. Spring 45 permits relative opposite rocking of pawls 34 and 35 on stud 33 but biases them both toward a neutral position to be described.

Upstanding from the surface of plate 24 are two fixed knockout studs 47 and 48 adapted to coact with pawls 34 and 35 respectively. Studs 47 and 48 are equidistant from the line joining the axes of stud 33 and shaft 23 and are preferably cylindrical.

Referring to FIGURE 2, pawl 34 on its inner edge has a central stud bearing surface 51, and diverging ramp faces 52 and 53. Similarly pawl 35 has on its inner edge a central stud bearing surface 54, and diverging ramp faces 55 and 56. Pawls 34 and 35 are essentially identical except for the depressed pivot ear of pawl 35 shown in FIGURE 4.

On the bottom surface of plate 24 a shift selector bar 57 is slidably mounted and held against plate 24 for sliding reciprocable movement perpendicular to the line joining the axes of stud 33 and shaft 23, as by guides 58 and 59.

Plate 24 is formed with an elongated narrow slot 61 that extends at right angles to the line joining the axes of stud 33 and shaft 23 and an equal distance on opposite sides of that line. Bar 57 has an upturned portion slidable in slot 61 providing a ledge 62 projecting above the surface of plate 24 for a purpose to appear. Ledge 62 is shorter than the length of slot 61 which serves to limit its movement.

The purpose of ledge 62 is to hold one or the other of pawls 34 or 35 inoperative with respect to wheel 22 during operation. FIGURE 2 shows the bar 57 displaced to the left to its limit position where ledge 62 engages pawl 35 and holds it inoperative with respect to index wheel 22. This, by virtue of the torque transmitted through spring 45, results in pawl 34 being urged clockwise about pivot stud 33 until tip 37 engages index wheel 22 in the space between two adjacent teeth. Clockwise displacement of pawl 34 is limited by stud 47 engaging pawl surface 51.

The parts are now positioned to rotate wheel 22 clockwise or in the direction of the arrow in FIGURE 2, which will result in sliding displacement of magazine 11 to the left in FIGURE 2.

In order to effect the rotation of wheel 22 a force is applied to projection 42 to swing the stud carrier clockwise in FIGURE 2. Since pawl tip 37 is positively engaged with wheel 22, as soon as enough force is applied to overcome the bias of spring 28 to enable the teeth of wheel 22 to cam detent 26 out, wheel 22 will start to rotate in the direction of the arrow. By the time wheel 22 has been rotated an angular extent of approximately one tooth the pawl 34 will have reached the position where kickout stud 47 engages face 52 whereupon the pawl 34 is swung counterclockwise out of engagement with the teeth of wheel 22. At this time detent 26, which is now poised at the space between the next two teeth that has moved into alignment with it, acts by reason of its V-shape to enter that space, determine the rotated position of the wheel and hold it there thus anchoring the magazine in its selected position.

FIGURE 7 shows the parts in the position they relatively occupy when the slide pusher 19 is at its extreme outwardly displaced position at the end of a slide changing cycle, a condition which also exists when a magazine is being introduced into the guide 12. It is at this time that the pawl knockout studs both come into play.

As lever 32 swings clockwise in FIGURE 7 the inclined cam faces 52 and 55 encounter fixed studs 47 and 48 respectively which results in both pawls 34 and 35 being cammed outwardly, swinging oppositely about their common pivot 33, until in the extreme position of FIGURE 7 both pawls are positively held away from engagement with index wheel 22, the latter now being solely controlled by pawl detent 26. Lever 32 is stopped in the FIGURE 7 position by stud 33 engaging the end of slot 39.

This condition exists when a new magazine is being inserted into guide 12, and it is necessary to permit repositioning of the magazine along the guide manually to pass over certain slides in the magazine. When the magazine is manually pushed ahead for example the detent will center it with tube 13 for accurate slide extraction.

Now the projection 42 is released and the parts return to the FIGURE 2 position. During such return the pawl tip 37 may cam over the teeth of wheel 22 but the restoring force of spring 41 is not enough to overcome the force of detent bias spring 28, so that there is no reverse rotation of wheel 22 and the new magazine position is maintained.

During all the foregoing ledge 62 keeps pawl 35 out of engagement with wheel 22.

Suppose it is desired to rotate wheel 22 in the opposite counterclockwise direction. The operator grasps the left end of bar 57 which projects below plate 24 and pushes it to the irght to the limit position determined by engagement of ledge 62 with the left end of slot 61.

Ledge 62 will leave pawl 35 which will swing into engagement with wheel 22, and engagement of ledge 62 with pawl 34 will swing that pawl 34 counterclockwise to an inoperative position corresponding to that of pawl 35 in FIGURE 2. Now clockwise swinging of the pawl carrier arm will result in pawl tip 36 positively rotating wheel 22 counterclockwise and the operation is essentially the same as above described.

Slidable with pusher 19 is a reciprocable bar 65 which carries a latch 66 in the form of a lever 67 pivoted at 68 on bar 65. At one side lever 67 is backed by a resilient abutment in the form of a spring leaf 69 slidably bearing thereagainst at one end and anchored at the other end on bar 55. This abutment 69 tends to prevent rocking movement of lever 67 clockwise beyond the position of FIGURE 6 where lever 67 is at approximately right angles to bar 65. A light spring 71 much less strong than spring 69 tends to maintain lever 67 against its abutment 69.

During operation of the device slide pusher 19 reciprocates into and out of the magazine as in Patent 2,711,602. The latch 66 provides for movement of stud 33 in the magazine indexing direction but only after the slide being handled by pusher 19 has returned to the magazine.

The lever 67 is therefore located on bar 65 so that lever 67 abuts projection 42 just after the slide reenters the magazine. As the bar 65 moves to the left it will carry projection 42 along with it for the length of slot 39, the resistance offered by the pawl mechanism being smaller than the strength of abutment spring 69. This effects the above described rotation of index wheel 22 the distance of one tooth.

As soon as projection 42 reaches the end of slot 39 its motion is stopped and further movement of bar 65 to the left in FIGURE 6 results in collapse of the latch by lever 67 rotating clockwise against the force of abutment 69 sufficiently to move past projection 42, which latter is now freed to return to the FIGURE 2 position. After passing projection 42 lever 67 springs out to the illustrated position of FIGURE 6.

When bar 65 is moving to the right in FIGURE 6 during the introduction of the slide into the tube 13, engagement of lever 67 with projection 42 results only in counterclockwise pivot of lever 67 until it passes projection 42 and then springs out to the solid line position wherein it is ready to shift projection 42 on the stroke to the left in FIGURE 6.

Referring to FIGURES 2, 3 and 5, the foregoing described pawl mechanism lying above the top surface of plate 24 is covered by a fixed plate 70 which at its corners is secured in spaced relation to plate 24 as by rivets 73. The upper horizontal flat surface 72 of plate 70 slidably supports the flat side surface of magazine 11, and as shown in FIGURE 5 the rack teeth 21 on the magazine extend below the edge of plate 70 to mesh with index wheel 22. Plate 70 thus in effect is a shield preventing the magazine from interfering with the action of the pawls.

In operation in the invention as disclosed the bar 65 may be compound and composed of telescoping bar sections coupled by a longitudinal slotted connection as in Patent 2,711,602. Thus during the last part of the leftwise movement of bar 65 the indexing operation is accomplished. This is quite satisfactory where pusher 19 hooks onto the slide for pushing and pulling as in said patent. It will be understood however, that the foregoing indexing action and mechanism are independent of the manner in which the slide is pushed or otherwise removed from the magazine, or returned to the magazine. For example the bar 65 may be a simpler rigid bar movable with the pusher, with the latch properly located thereon, this usually being provided where the slide is ejected and returned by spaced arms respectively engaging opposite side edges of the slide, as in a slide handling device of the type shown in German Patent No. 319,726 or Goldberg Patent No. 2,756,630.

Similarly the bar 65 of applicant may be cam actuated separately from a timed cam operated pusher that actuates the slide, as in the type of automatic projector shown in Briskin 2,909,098. In other words the indexing and selective drive, forward or reverse, of applicant may be applied to any automatic slide projector regardless of the particular type of slide extraction and return used in connection with the magazine without departing from the spirit of the herein claimed invention.

The invention therefore provides a reversible projection slide magazine drive wherein the direction of drive is easily selected and maintained. The drive direction selector is such that the pawl corresponding to the non-drive direction is assured of disengagement with the drive for the magazine, this being contributed to in the preferred embodiment by the combined action of the selector ledge and the kickout studs, the action of the latter being permitted by the spring relative motion permitting connection between the pivoted pawl arms.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for selectively reversibly driving a projection slide magazine comprising a toothed drive wheel mounted for rotation about an axis, said wheel being adapted for mesh with a rack on the magazine, a resiliently biased detent for normally maintaining said wheel against rotation, pawl means comprising at least two pawl arms, means movably mounting said pawl means for selectively operatively connecting one or the other of said pawl arms with said drive wheel for selecting the direction of rotation of said drive wheel, means for actuating said pawl means to rotate said drive wheel through a predetermined angle in a selected direction, said detent permitting said rotation and then holding the wheel against unintended further rotation, and abutment means in the path of movement of said pawl means for engaging and positively moving said pawl arms away from operative connection with said toothed drive wheel regardless of the direction of drive.

2. In the apparatus defined in claim 1, said pawl arms being swingable about a pivot axis, and manual means for engaging and swinging a selected pawl arm to a position where it cannot have drive engagement with said toothed wheel.

3. In the apparatus defined in claim 1, said pawl arms being swingable about a common pivot, and said pawl arms being arranged to extend in diverging relation from said pivot to effectively opposite sides of said wheel, said pawl arms being adapted to engage said wheel on the opposite side of its axis from said magazine.

4. In the apparatus defined in claim 1, means providing a common pivot mount for said pawl arms, and said means for actuating said pawl means comprising means for shifting said pivot mount.

5. Apparatus for indexing a projection slide magazine provided with longitudinal rack teeth comprising a guide on which said magazine is adapted to be longitudinally slidably mounted, a toothed index wheel rotatably mounted on said guide and adapted to mesh with said rack, slide handling means comprising a member reciprocably mounted on said guide for movement transversely of said magazine, pawl means for angularly driving said wheel, means operably connecting said member to actuate said pawl means to rotate said wheel, means for selecting the direction of drive of said wheel by said pawl means and abutment means in the path of movement of said pawl means for engaging said pawl means for operably disconnecting drive to said wheel after predetermined angular rotation of said wheel.

6. Apparatus for reversibly shifting a projection slide magazine comprising a rotatably mounted toothed index wheel adapted to mesh with a rack on the magazine, two pawl arms, a carrier on which said pawl arms are pivoted, means pivoting said carrier to swing about an axis parallel to the axis of rotation of said wheel, means for selectively moving one or the other of said pawl arms into drive engagement with said index wheel, means for actuating said carrier, and fixed abutment means in the path of movement of said pawl arms adapted to engage and shift said pawl arms to inoperative non-drive position after predetermined rotation of said wheel.

7. In the apparatus defined in claim 6, said pawl arms having a common pivot on said carrier and being arranged to symmetrically diverge with respect to a line joining said axis with the axis of rotation of said index wheel.

8. Apparatus for reversibly shifting a projection slide magazine comprising a rotatably mounted magazine indexing member, a movably mounted pawl carrier, two pawl arms independently pivoted on a common pivot on said carrier, relative motion limiting means interconnecting said pawl arms comprising a spring extending between said pawl arms, means for selectively moving one or the other of said pawl arms into operative drive engagement with said index member, and means for actuating said carrier.

9. Apparatus for reversibly shifting a projection slide magazine comprising a rotatably mounted magazine indexing member, a movably mounted pawl carrier, two pawl arms independently pivoted on said carrier, relative motion limiting means interconnecting said pawl arms, means for selectively moving one or the other of said pawl arms into operative drive engagement with said index member comprising an abutment disposed between and shiftable into operative contact with the pawl arm to be disabled from driving said index member, and means for actuating said carrier.

10. Apparatus for reversibly shifting a projection slide magazine comprising a rotatably mounted magazine indexing member, a movably mounted pawl carrier, two pawl arms independently pivoted on said carrier, relative motion limiting means interconnecting said pawl arms, means for selectively moving one or the other of said pawl arms into operative drive engagement with said index member, each pawl arm having on the edge facing the other a cam face, fixed pawl arm kickout studs being so disposed that one of them slidably engages the cam face on the pawl arm that is in non-driving relation to the index member to prevent that non-driving pawl arm from engaging the index member as the carrier is actuated, and means for actuating said carrier.

11. In a projection slide handling apparatus, a rotatable toothed index wheel adapted to displace a slide magazine longitudinally along a guide, a movably mounted pawl carrier, a resiliently biased pawl arm pivoted on said carrier and having a part adapted to engage said toothed wheel, means for moving said carrier in a selected direction to cause said pawl to rotate said wheel through a predetermined angle, and means comprising a fixed member engaged by said pawl arm for swinging said pawl arm away from engagement with said index wheel at the end of movement of said carrier in said selected direction.

References Cited in the file of this patent
UNITED STATES PATENTS

| | | |
|---|---|---|
| 2,874,497 | Huff et al. | Feb. 24, 1959 |
| 2,907,128 | Norton | Oct. 6, 1959 |
| 2,915,840 | Wiklund | Dec. 8, 1959 |